United States Patent
An et al.

(10) Patent No.: US 9,124,116 B2
(45) Date of Patent: Sep. 1, 2015

(54) ELECTRICAL CHARGE RELAY ENHANCER AND SOLAR CELL SYSTEM INCLUDING THE ENHANCER

(75) Inventors: Hyun-Ku An, Osan-si (KR); Hak-Soo Kim, Seoul (KR); Soo Wohn Lee, Cheonan-si (KR); Tae Ho Kim, Cheonan-si (KR)

(73) Assignee: Industry-University Cooperation Foundation Sunmoon University, Asan-si, Chungcheongnam-do (KR)

( * ) Notice: Subject to any disclaimer, the term of this patent is extended or adjusted under 35 U.S.C. 154(b) by 404 days.

(21) Appl. No.: 13/519,917

(22) PCT Filed: Dec. 28, 2010

(86) PCT No.: PCT/KR2010/009391
§ 371 (c)(1),
(2), (4) Date: Jun. 29, 2012

(87) PCT Pub. No.: WO2011/081391
PCT Pub. Date: Jul. 7, 2011

(65) Prior Publication Data
US 2012/0274265 A1   Nov. 1, 2012

(30) Foreign Application Priority Data
Dec. 30, 2009  (KR) .................. 10-2009-0134341

(51) Int. Cl.
*H02J 7/00* (2006.01)
*H02J 7/35* (2006.01)

(52) U.S. Cl.
CPC ............ *H02J 7/0052* (2013.01); *H02J 7/35* (2013.01); *H02J 2007/0059* (2013.01); *Y02E 10/566* (2013.01); *Y02E 70/40* (2013.01)

(58) Field of Classification Search
CPC ... H02J 7/35; H02J 7/0052; H02J 2007/0059; Y02E 70/40; Y02E 10/566
See application file for complete search history.

(56) References Cited

U.S. PATENT DOCUMENTS

| 6,703,793 | B2 * | 3/2004 | Kitano | 315/224 |
| 7,750,612 | B2 * | 7/2010 | Yokosawa | 323/282 |
| 7,751,230 | B2 * | 7/2010 | Kim et al. | 365/154 |

(Continued)

FOREIGN PATENT DOCUMENTS

| JP | 08-330953 A | 12/1996 |
| JP | 2000-349598 A | 12/2000 |

(Continued)

*Primary Examiner* — Naum B Levin
(74) *Attorney, Agent, or Firm* — Novick, Kim & Lee, PLLC; Jae Youn Kim

(57) ABSTRACT

A charge relay enhancer used in relaying a charge produced in a solar cell to a charger, and a solar cell system including the charge relay enhancer. The charge relay enhancer includes: a charge induction and pumping device inducing a charge by using a power voltage from among two power voltages of different polarities selected in response to a control signal, and pumping the induced charge; and a charge pathway selecting device relaying the charge input to an input terminal via two input/output terminals, to the charge induction and pumping device, receiving the charge pumped by the charge induction and pumping device via the two input/output terminals, and outputting the charge to an output terminal. Accordingly, as charges produced in a solar cell may be relayed to a charging device as much as possible, efficiency of relaying charges produced in the solar cell to the charging device may be maximized.

8 Claims, 3 Drawing Sheets

(56) References Cited

U.S. PATENT DOCUMENTS

| | | | |
|---|---|---|---|
| 7,977,920 B2 * | 7/2011 | Pollak et al. | 320/140 |
| 8,350,523 B2 * | 1/2013 | Kajouke et al. | 320/108 |
| 2004/0159102 A1 * | 8/2004 | Toyomura et al. | 60/641.8 |
| 2005/0082989 A1 * | 4/2005 | Jones et al. | 315/194 |
| 2008/0198523 A1 * | 8/2008 | Schmidt et al. | 361/88 |
| 2010/0013428 A1 * | 1/2010 | Shin | 320/101 |

FOREIGN PATENT DOCUMENTS

| | | |
|---|---|---|
| KR | 10-1997-0024562 A | 5/1997 |
| KR | 10-2000-0062900 A | 10/2000 |
| KR | 10-2003-0042064 A | 5/2003 |

* cited by examiner

ELECTRICAL CHARGE RELAY ENHANCER AND SOLAR CELL SYSTEM INCLUDING THE ENHANCER

TECHNICAL FIELD

The present invention relates to a charge relay enhancer and a solar cell system including the charge relay enhancer, and more particularly, to a charge relay enhancer used in relaying a charge produced in a solar cell to a charger and a solar cell system including the charge relay enhancer.

BACKGROUND ART

Recently, in order to minimize climate change around the world due to the use of fossil fuels, attention has been focused on use of natural energies such as solar energy is or wind energy. One representative example is the use of solar cells which convert solar energy into electrical energy.

A solar cell uses a photoelectric effect that involves converting light energy of the sun into electrical energy. The photoelectric effect has been derived while searching for the reasons why electrons are generated from a metal plate that is exposed to light, and is proof that light has the characteristics of particles. Light particles are referred to as photons, and photons in motion collide with a metal plate of a solar cell to generate positive electrons corresponding to kinetic energy of the photons from the metal plate, and a solar cell stores the generated electrons.

Factors that affect efficiency of a solar cell are, for example, an amount of solar light reflected by a surface of a solar cell and loss due to internal resistance of a solar cell. A surface of a commercialized solar cell is usually formed of iron reinforced glass or epoxy resin. About 10% of reflection occurs on glass that is not anti-reflection coated (AR coating) or on epoxy resin. The amount of electrical energy generated in a solar cell that is lost as thermal energy due to electrical resistance of the solar cell is also considerable. In addition, the solar cell does not convert light of all wavelengths because a conversion rate of light differs according to wavelengths.

Accordingly, although not all incident light energy is converted into electrical energy, apart from the research into this, electrical energy that is once generated has to be relayed to a charger without any loss such as leakage. According to the conventional art, electrical energy accumulated in a solar cell, that is, electrons, are not relayed to a charging cell and thus a ratio between the number of the generated electrons and the number of electrons used in charging is considerably low, and this further reduces conversion efficiency.

DISCLOSURE OF THE INVENTION

Technical Problem

The present invention provides a charge relay enhancer relaying electrons produced in a solar cell to a charger as much as possible without any loss.

The present invention provides a solar cell system including the charge relay is enhancer relaying electrons produced in a solar cell to a charger as much as possible without any loss.

Technical Solution

According to an aspect of the present invention, there is provided a charge relay enhancer comprising: a charge induction and pumping device inducing a charge by using one power voltage from among two power voltages of different polarities selected in response to a control signal, and pumping the induced charge; and a charge pathway selecting device relaying the charge that is input to an input terminal, to the charge induction and pumping device via two input/output terminals, receiving the charge pumped by the charge induction and pumping device via the two input/output terminals, and outputting the charge to an output terminal.

The charge induction and pumping device may comprise: a first charge induction and pumping device inducing a charge by using one power voltage from among two power voltages of different polarities selected in response to a control signal, and pumping the induced charge; and a second charge induction and pumping device inducing the charge by using one power voltage from among two power voltages of different polarities selected in response to the control signal, and pumping the induced charge. The charge path selecting device may respectively relay the charge input to the input terminal, via the two input/output terminals, to the first charge induction and pumping device and the second charge induction and pumping device, respectively receive the charge pumped by the first charge induction and pumping device and the second charge induction and pumping device, via the two input/output terminals, and output the pumped charge to the output terminal.

According to another aspect of the present invention, there is provided a charge relay enhancer comprising: a first charge induction and pumping device inducing a charge from a charge supply source for a first period of time and pumping the induced charge during a second period of time; a second charge induction and pumping device pumping a charge during the first period of time and inducing a charge from the charge supply source during the second period of time; and a charge pathway selecting device is relaying the charge from the charge supply source to the first charge induction and pumping device and the second charge and pumping device, and alternately relaying the charge pumped by the first charge induction and pumping device and the second charge and pumping device to a charging device.

According to another aspect of the present invention, there is provided a solar cell system comprising: a solar cell; a charge relay enhancer; and a charging battery, wherein the charge relay enhancer comprises: a first charge induction and pumping device inducing a charge from the solar cell during a first period of time and pumping the induced charge during a second period of time; a second charge induction and pumping device pumping a charge during the first period of time and inducing the charge from the solar cell during the second period of time; and a charge pathway selecting device relaying the charge from the solar cell to the first charge induction and pumping device and the second charge and pumping device, and alternately relaying the charge pumped by the first charge induction and pumping device and the second charge and pumping device to the charging battery.

Advantageous Effects

As described above, according to the charge relay enhancer and the solar cell system including the charge relay enhancer of the embodiments of the present invention, charges produced in a solar cell may be relayed to a charging device as much as possible, and thus efficiency of relaying charges produced in a solar cell to a charging device may be maximized.

BEST MODE FOR CARRYING OUT THE INVENTION

Figure 1:
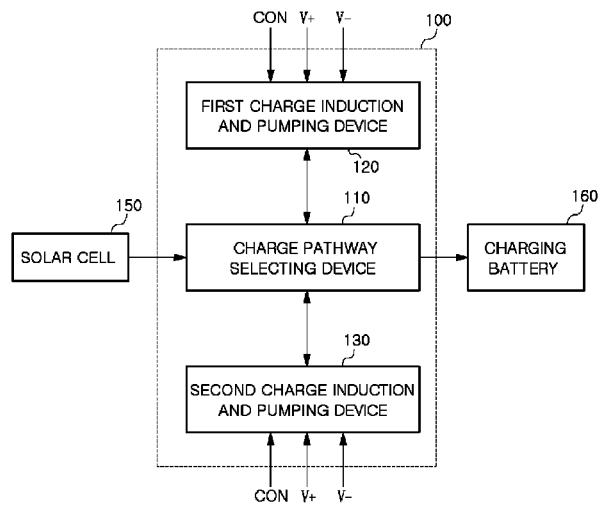
FIG. 1 is a block diagram illustrating a solar cell system including a charge relay enhancer according to an embodiment of the present invention.

Hereinafter, a charge relay enhancer and a solar cell system including the charge relay enhancer will be described in detail with reference to the drawings. In the description of the present invention, certain detailed explanations of related art are omitted when it is deemed that they may unnecessarily obscure the essence of the invention. The terms are defined in consideration of functions in regard to the present invention and may vary according to the intention of clients, operators, or users or in accordance with the custom. Thus, the terms should be defined based on the overall specification of the present invention.

Throughout the drawings, like reference numerals denote like elements.

FIG. 1 is a block diagram illustrating a solar cell system including a charge relay enhancer 100 according to an embodiment of the present invention.

Referring to FIG. 1, the electron relay enhancer 100 performs the function of relaying charges produced in a solar cell 150 to a charging battery 160, and includes two, first and second charge induction and pumping devices 120 and 130 and a charge pathway selecting device 110.

The first charge induction and pumping device 120 induces a charge by using a power voltage from among two power voltages $V_+$ and $V_-$ of different polarities selected in response to a control signal CON, and pumps the induced charge.

The second charge induction and pumping device 130 induces a charge by using a power voltage from among two power voltages $V_+$ and $V_-$ of different polarities selected in response to a control signal CON, and pumps the induced charge.

The charge pathway selecting device 110 relays a charge that is received via an is input terminal, via two input/output terminals to each of the first charge induction and pumping device 120 and the second charge induction and pumping device 130, and receives the charge that is pumped by the first charge induction and pumping device 120 and the second charge induction and pumping device 130 via the two input/output terminals, and outputs the charge to an output terminal.

As indicated by its name, the charge relay enhancer may be used to increase relay efficiency of not only charges, that is, electrons, but also that of holes. However, for easier understanding of the present invention, here, a charge producing apparatus will be limited here only to a solar cell. Accordingly, produced charges will be electrons. It will be obvious to one of ordinary skill in the art to modify the apparatus, which will be described below, in order to apply the apparatus in the case of holes.

Figure 2:
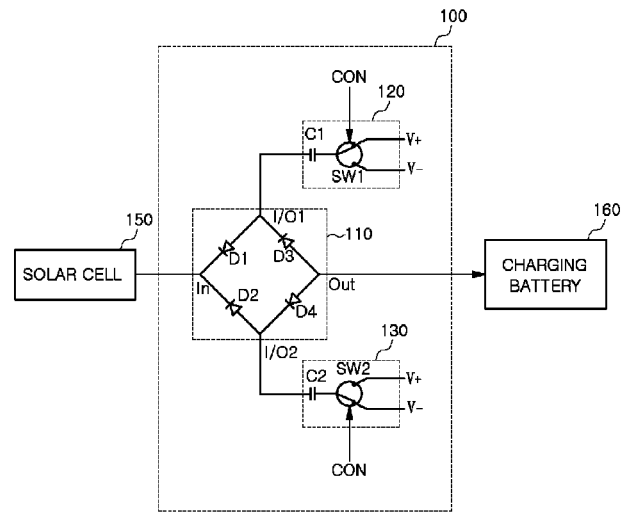
FIG. 2 is a diagram of a solar cell system including the charge relay enhancer illustrated in FIG. 1 according to an embodiment of the present invention.

FIG. 2 is a diagram of a solar cell system including the charge relay enhancer 100 illustrated in FIG. 1 according to an embodiment of the present invention.

Referring to FIG. 2, the charge pathway selecting device 110 includes four, first through fourth diodes D1 through D4. A first terminal of the first diode D1 is connected to an input terminal In and a second terminal of the first diode D1 is connected to a first input/output terminal I/O1. A first terminal of the second diode D2 is connected to the input terminal In and a second terminal of the second diode D2 is connected to a second input/output terminal I/O2. A first terminal of the third diode D3 is connected to the first input/output terminal I/O1 and a second terminal of the third diode D3 is connected to an output terminal Out. A first terminal of the fourth diode D4 is connected to the second input/output terminal I/O2 and a second terminal of the fourth diode D4 is connected to the output terminal Out. Here, a diode that relays a charge in one direction is described as an example of a charge relay. However, a transistor may also be used as a charge relay. The reason why a charge relay relaying a charge in one direction is used in the charge pathway selecting device 110 will be clearly understood from the description of operating characteristics of the present invention with reference to FIGS. 3 and 4 below.

The first charge induction and pumping device 120 includes a first capacitor C1 and a first switch SW1. A first terminal of the first capacitor C1 is connected to the first input/output terminal I/O1. The first switch SW1 switches one of a first power voltage $V_+$ is and a second power voltage $V_-$, selected in response to a control signal CON, to a second terminal of the first capacitor C1.

The second charge induction and pumping device 130 includes a second capacitor C2 and a second switch SW2. A first terminal of the second capacitor C2 is connected to the second input/output terminal I/O2. The second switch SW2 switches one of a first power voltage $V_+$ and a second power voltage $V_-$, selected in response to a control signal CON, to a second terminal of the second capacitor C2. Here, as a switch, for example, a single transistor, a transmission gate formed of two transistors, or a relay may be used.

Hereinafter, an operation of a charge relay enhancer (electron relay enhancer) illustrated in FIG. 2 according to an embodiment of the present invention will be described. Here, the first and second terminals of each of the first through fourth diodes D1 through D4 will be assumed as being a P-type terminal and an N-type terminal, respectively. The P-type terminal refers to an active area including P-type impurities of a PN diode, and the N-type terminal refers to an active area including N-type impurities. Electrons easily move from an N-type terminal to a P-type terminal, and holes easily move from the P-type terminal to the N-type terminal, but the opposite is not possible due to potential barriers formed in a PN junction.

An electron that is relayed from the solar cell 150 is input to the N-type terminal of the first diode D1 and the second diode D2. The electron that has passed through the first diode D1 may move from the first input/output terminal I/O1 to the first charge induction and pumping device 120 and to the third diode D3. Likewise, the electron that has passed through the second diode D2 may move from the second input/output terminal I/O2 to the second charge induction and pumping device 130 and to the fourth diode D4. The electron that has passed through the third diode D3 and the fourth diode D4 are relayed to and accumulated in the charging battery 160.

One of the first and second power voltages $V_+$ and $V_-$ is connected to the second terminal of the first capacitor C1 included in the first charge induction and pumping device 120 according to a control signal CON. Here, the first power voltage $V_+$ has a positive voltage potential, and the second power voltage $V_-$ has a negative voltage is potential.

Electrons that are produced in the solar cell 150 pass through the first diode D1 to be relayed to the first input/output terminal I/O1, and the electrons relayed thereto pass through the third diode D3 and move to the charging battery 160 or to the first charge induction and pumping device 120. When the first power voltage $V_+$ having a positive potential is applied to the second terminal of the first capacitor C1, the electrons relayed to the first input/output terminal I/O1 do not pass through the third diode D3 and move to the charging battery 160 but may be induced to the first terminal of the first capacitor C1.

Conversely, when the second power voltage $V_-$ having a negative voltage potential is applied to the second terminal of the first capacitor C1, holes are induced to the first terminal of the first capacitor C1. Here, induction of holes means that previously induced charges are repelled, and the repelled electrons pass through the third diode D3 and move all to the charging battery 160. Hereinafter, electrons being repelled will be referred to as pumping of electrons.

In this case, by setting an appropriate voltage potential of the first and second power voltages $V_+$ and $V_-$, all of the electrons relayed to the first input/output terminal I/O1 may all be induced to the first capacitor C1, and all of the induced electrons may pass through the third diode D3 and pumped to the charging battery 160.

One of the first and second power voltages $V_+$ and $V_-$ is connected to the second terminal of the second capacitor C2 included in the second charge induction and pumping device 130 according to a control signal CON.

Electrons produced in the solar cell 150 pass through the second diode D2 and are relayed to the second input/output terminal I/O2, and the electrons relayed thereto may pass through the fourth diode D4 and move to the charging battery 160 or to the second charge induction and pumping device 130. When the first power voltage $V_+$ having a positive potential is applied to the second terminal of the second capacitor C2, the electrons relayed to the second input/output terminal I/O2 do not pass through the fourth diode D4 and move to the charging battery 160 but may be induced to the first terminal of the second capacitor C2.

Conversely, when the second power voltage $V_-$ having a negative voltage potential is applied to the second terminal of the second capacitor C2, charges induced to the first terminal of the second capacitor C2 pass through the fourth diode D4 and may all be pumped to the charging battery 160.

As described above, the first charge induction and pumping device 120 and the second charge induction and pumping device 130 may perform the same function, and according to the current embodiment of the present invention, the first charge induction and pumping device 120 and the second charge induction and pumping device 130 are used in different, divided time periods. That is, while electrons are being induced to one functional block, the other functional block pumps the induced electrons to the charging battery 160. This operation is performed according to a control signal CON.

Referring to FIG. 2, when the first switch SW1 switches the first power voltage $V_+$, the second switch SW2 switches the second power voltage $V_-$.

Figure 3:
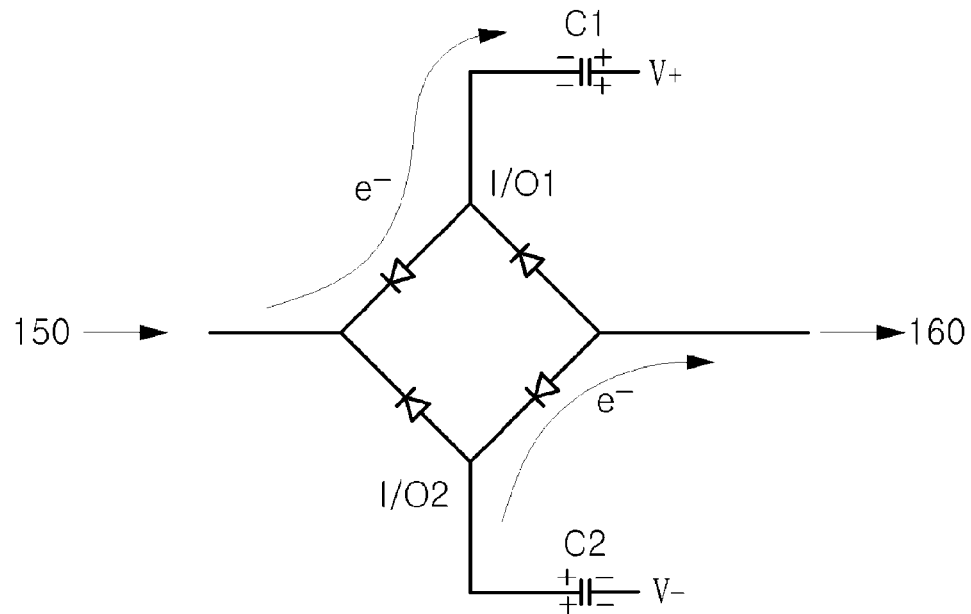
FIG. 3 is a circuit diagram showing a flow of an electron where an electron is induced to a first charge induction and pumping device and a second charge induction and pumping device pumps the induced electron.

FIG. 3 is a circuit diagram showing a flow of an electron where an electron is induced to the first charge induction and pumping device 120 and the second charge induction and pumping device 130 pumps the induced electron.

Referring to FIG. 3, as the first power voltage $V_+$ having a positive voltage potential is applied to a right-side terminal of the first capacitor C1 of the first charge induction and pumping device 120, electrons e⁻ that are relayed from the solar cell 150 to the first input/output terminal I/O1 are induced to the first terminal of the first capacitor C1. Here, as the second power voltage $V_-$ having a negative voltage potential is applied to a right-side terminal of the second capacitor C2 of the second charge induction and pumping device 130, electrons e⁻ that are induced to the first terminal of the second capacitor C2 are pumped to the charging battery 160.

Figure 4:
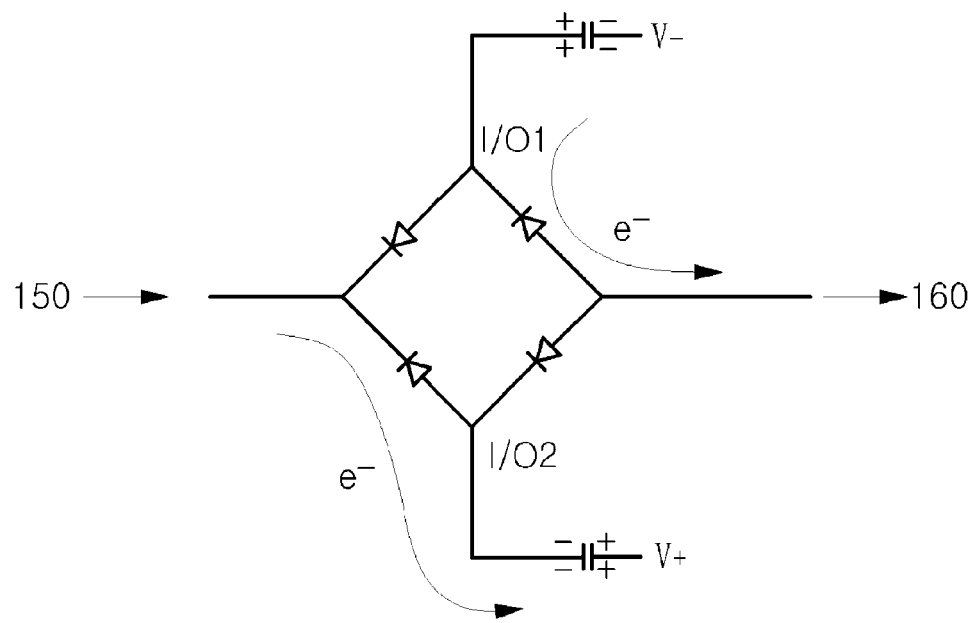
FIG. 4 is a circuit diagram showing a flow of an electron where an electron is induced to a second charge induction and pumping device and a first charge induction and pumping device pumps the induced electron.

FIG. 4 is a circuit diagram showing a flow of an electron where an electron is induced to the second charge induction and pumping device 130 and the first charge induction and pumping device 120 pumps the induced electron.

Referring to FIG. 4, as the second power voltage $V_-$ having a negative voltage potential is applied to the right-side terminal of the first capacitor C1 of the first charge induction and pumping device 120, electrons that are previously induced to the first is terminal of the first capacitor C1 are pumped to the charging battery 160. As the first power voltage $V_+$ having a positive voltage potential is applied to the right-side terminal of the second capacitor C2 of the second charge induction and pumping device 130, electrons e⁻ that are relayed from the solar cell 150 to the second input/output terminal I/O2 are induced to the first terminal of the second capacitor C2.

Various methods may be used to generate the two power voltages $V_+$ and $V_-$; for example, the two power voltages $V_+$ and $V_-$ may be generated by converting an alternating current (AC) power by using an alternating current-direct current (AC-DC) converter or by dropping a voltage potential of a DC voltage source having a higher voltage potential than a set voltage.

Figure 5:
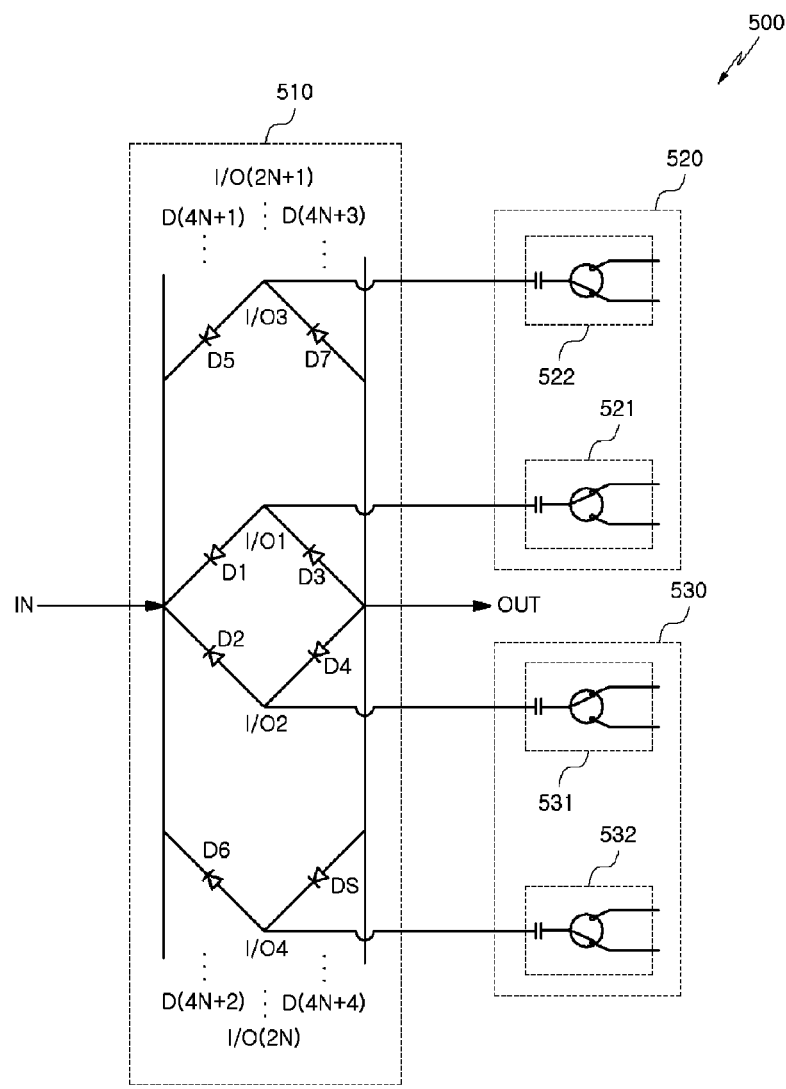
FIG. 5 is a circuit diagram of a solar cell system including the charge relay enhancer of FIG. 1 according to another embodiment of the present invention.

FIG. 5 is a diagram of a solar cell system 500 including a charge relay enhancer of FIG. 1 according to another embodiment of the present invention.

Referring to FIG. 5, a charge pathway selecting device 510 further includes 4N diodes (N is an integer of 1 or greater) in addition to the four, first through fourth diodes D1 through D4 illustrated in FIG. 2. In addition, a first charge induction and pumping device 520 and a second charge induction and pumping device 530 include N pairs of a capacitor and a switch in addition to the capacitor and switch pairs illustrated in FIG. 2.

When the charge pathway selecting device 510 includes a total of eight diodes, the first charge induction and pumping device 520 and the second charge induction and pumping device 530 may respectively include two pairs of capacitors and switches, that is, a pair 521 including a first capacitor and a first switch and a pair 522 including a second capacitor and a second switch and a pair 531 including a first capacitor and a first switch and a pair 532 including a second capacitor and a second switch. In this case, the additional four diodes, fifth through eights D5 through D8 added to the charge pathway selecting device 510 are configured as follows. A first terminal of the fifth diode D5 is connected to an input terminal In, and a second terminal of the fifth terminal D5 is connected to a third input/input terminal I/O3. A first terminal of the sixth diode D6 is connected to the input terminal In, and a second terminal of the sixth terminal D6 is connected to a fourth input/input terminal I/O4. A first terminal of the seventh diode D7 is connected to the third input/input terminal I/O3, and a second terminal of the seventh terminal D7 is connected to an output terminal Out. A first terminal of the eighth diode D8 is connected to the fourth input/output terminal I/O4, and a second terminal of the eighth diode D8 is connected to the output terminal Out. Here, the pair 521 is connected to the first input/output terminal I/O1, the pair 522 is connected to the third input/output terminal I/O3, the pair 531 is connected to the second input/output terminal I/O2, and the pair 532 is connected to the fourth input/output terminal I/O4.

When the charge pathway selecting device 510 is formed of a total of twelve diodes, the first charge induction and pumping device 520 and the second charge induction and pumping device 530 may each include three pairs of capacitors and switches.

The structure of diodes and pairs of capacitors and switches may be generally described as follows. When the charge pathway selecting device 510 is formed of a total of 4N diodes, the first charge induction and pumping device 520 and the second charge induction and pumping device 530 may each include N pairs of capacitors and switches.

The 4N diodes of the charge pathway selecting device 510 may be generalized as below. A first terminal of a (4N+1)-th diode D(4N+1) is connected to an input terminal In, and a second terminal of the (4N+1)-th diode D(4N+1) is connected to a (2N+1)-th input/output terminal I/O(2N+1). A first terminal of a (4N+2)-th diode D(4N+2) is connected to the input terminal In, and a second terminal of the (4N+2)-th diode D(4N+2) is connected to a 2N-th input/output terminal I/O(2N). A first terminal of a (4N+3)-th diode D(4N+3) is connected to the (2N+1) input/output terminal I/O(2N+1), and a second terminal of the (4N+3)-th diode D(4N+3) is connected to an output terminal Out. A first terminal of a (4N+4)-th diode D(4N+4) is connected to the 2N-th input/output terminal I/O(2N), and a second terminal of the (4N+4)-th diode D(4N+4) is connected to the output terminal Out.

Here, a solar cell used according to the embodiments of the present invention may be replaced by a fuel cell, and in this case, efficiency of the fuel cell may be improved.

In addition, the charge relay enhancer according to the embodiments of the is present invention may be applied to a photocatalyst air purifier, thereby improving efficiency of the photocatalyst air purifier.

Also, the charge relay enhancer according to the embodiments of the present invention may be applied to light emitting diodes (LED) or organic light emitting diodes (OLED) to thereby improve efficiency of the LEDs or OLEDs.

In addition, the first through fourth diodes D1 through D4 used in the embodiments of the present invention may also be replaced by switches or transistors such as a metal-oxide-semiconductor field effect transistor (MOSFET) or a bipolar junction transistor (BJT).

While this invention has been particularly shown and described with reference to exemplary embodiments thereof, the embodiments of the present invention are provided for illustrative purposes only, and it will be obvious to one of ordinary skill in the art that various changes, modifications or adjustments may be made without departing from the scope and spirit of the present invention. Therefore, the scope of the invention will be construed as including any examples of changes, modifications, or adjustments in the gist of the technical spirit of the present invention.

The invention claimed is:

1. A charge relay enhancer comprising:
   at least one charge induction and pumping device, each of which being configured for inducing a charge by using one power voltage from among two power voltages of different polarities selected in response to a control signal, and pumping the induced charge; and
   a charge pathway selecting device relaying the charge that is input to an input terminal, to the charge induction and pumping device via two input/output terminals, receiving the charge pumped by the charge induction and pumping device via the two input/output terminals, and outputting the charge to an output terminal.

2. The charge relay enhancer of claim 1, wherein the charge induction and pumping device comprises:
   a first charge induction and pumping device inducing the charge by using the one power voltage from among the two power voltages of different polarities selected in response to the control signal, and pumping the induced charge; and
   a second charge induction and pumping device inducing the charge by using the one power voltage from among the two power voltages of different polarities selected in response to the control signal, and pumping the induced charge.

3. The charge relay enhancer of claim 2, wherein during a time period in which the first charge induction and pumping device selects a first power voltage from among the two power voltages, the control signal directs the second charge induction and pumping device to select a second power voltage which is the remaining power voltage from among the two power voltages,
   wherein during a time period in which the first charge induction and pumping device selects the second power voltage from among the two power voltages, the control signal directs the second charge induction and pumping device to select the first power voltage which is the remaining power voltage from among the two power voltages.

4. The charge relay enhancer of claim 3, wherein the charge pathway selecting device comprises:
   a first diode whose first terminal is connected to the input terminal and whose second terminal is connected to a first input/output terminal of the two input/output terminals;
   a second diode whose first terminal is connected to the input terminal and whose second terminal is connected to a second input/output terminal of the two input/output terminals;
   a third diode whose first terminal is connected to the first input/output terminal and whose second terminal is connected to the output terminal; and
   a fourth diode whose first terminal is connected to the second input/output terminal and whose second terminal is connected to the output terminal.

5. The charge relay enhancer of claim 4, wherein the charge pathway selecting device further comprises:
   a (4N+1)-th diode whose first terminal is connected to the input terminal and whose second terminal is connected to a (2N+1)-th input/output terminal;
   a (4N+2)-th diode whose first terminal is connected to the input terminal and whose second terminal is connected to a 2N-th input/output terminal;
   a (4N+3)-th diode whose first terminal is connected to the (2N+1)-th input/output terminal and whose second terminal is connected to the output terminal; and
   a (4N+4)-th diode whose first terminal is connected to the 2N-th input/output terminal and whose second terminal is connected to the output terminal,
   wherein N is an integer of 1 or greater.

6. The charge relay enhancer of claim 1, wherein the charge that is input to the input terminal of the charge pathway selecting device is applied from a solar cell.

7. The charge relay enhancer of claim 6, wherein the charge is one of an electron and a hole.

8. The charge relay enhancer of claim 1, wherein the pumped charge that is output to the output terminal of the charge pathway selecting device is relayed to a charging battery.

* * * * *